United States Patent
Nijasure et al.

(10) Patent No.: US 10,460,513 B2
(45) Date of Patent: Oct. 29, 2019

(54) COMBINED WORLD-SPACE PIPELINE SHADER STAGES

(71) Applicant: Advanced Micro Devices, Inc., Sunnyvale, CA (US)

(72) Inventors: Mangesh P. Nijasure, Orlando, FL (US); Randy W. Ramsey, Orlando, FL (US); Todd Martin, Orlando, FL (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 103 days.

(21) Appl. No.: 15/389,481

(22) Filed: Dec. 23, 2016

(65) Prior Publication Data
US 2018/0082470 A1 Mar. 22, 2018

Related U.S. Application Data

(60) Provisional application No. 62/398,211, filed on Sep. 22, 2016.

(51) Int. Cl.
*G06T 15/80* (2011.01)
*G06T 15/00* (2011.01)

(52) U.S. Cl.
CPC ............ *G06T 15/80* (2013.01); *G06T 15/005* (2013.01)

(58) Field of Classification Search
CPC ......... G06T 15/80; G06T 15/005; G06T 1/20; G06T 2200/28; G06T 2201/00; G06F 13/12; G06F 13/124; G06F 13/126; G06F 13/1652; G06F 13/1657; G06F 13/1663; G06F 9/38
See application file for complete search history.

(56) References Cited

U.S. PATENT DOCUMENTS

| | | | | |
|---|---|---|---|---|
| 7,439,979 B1 * | 10/2008 | Allen | ........................ | G06T 1/20 345/506 |
| 7,468,726 B1 * | 12/2008 | Wloka | .................... | G06T 15/40 345/419 |
| 7,624,255 B1 * | 11/2009 | Rouet | ..................... | G06F 8/445 712/220 |
| 7,671,862 B1 * | 3/2010 | Patel | ..................... | G06T 15/005 345/501 |

(Continued)

OTHER PUBLICATIONS

Anonymous: AMD Graphics Cores NEXT (GCN) Architecture, White Paper—AMD, Jun. 30, 2012, 18 pages.

(Continued)

*Primary Examiner* — Devona E Faulk
*Assistant Examiner* — Charles L Beard
(74) *Attorney, Agent, or Firm* — Volpe and Koenig, P.C.

(57) ABSTRACT

Improvements to graphics processing pipelines are disclosed. More specifically, the vertex shader stage, which performs vertex transformations, and the hull or geometry shader stages, are combined. If tessellation is disabled and geometry shading is enabled, then the graphics processing pipeline includes a combined vertex and graphics shader stage. If tessellation is enabled, then the graphics processing pipeline includes a combined vertex and hull shader stage. If tessellation and geometry shading are both disabled, then the graphics processing pipeline does not use a combined shader stage. The combined shader stages improve efficiency by reducing the number of executing instances of shader programs and associated resources reserved.

18 Claims, 9 Drawing Sheets

(56) References Cited

U.S. PATENT DOCUMENTS

| Patent/Pub. No. | Date | Inventor | Classification |
|---|---|---|---|
| 7,821,520 B1 * | 10/2010 | Bastos | G06T 1/20 345/502 |
| 7,978,205 B1 * | 7/2011 | Patel | G06T 15/005 345/619 |
| 8,074,224 B1 * | 12/2011 | Nordquist | G06F 9/3012 712/20 |
| 8,149,243 B1 * | 4/2012 | Kilgard | G06T 15/04 345/530 |
| 8,237,725 B1 * | 8/2012 | Bowman | G06T 15/005 345/502 |
| 8,355,028 B2 * | 1/2013 | Jiao | G06T 15/005 345/522 |
| 8,429,656 B1 * | 4/2013 | Duluk, Jr. | G06F 9/5027 718/102 |
| 8,963,932 B1 * | 2/2015 | Kiel | G06F 11/3423 345/440 |
| 8,982,124 B2 * | 3/2015 | Li | G06T 15/60 345/426 |
| 9,064,334 B2 * | 6/2015 | Patel | G06T 15/50 |
| 9,256,976 B2 * | 2/2016 | Brown | G06T 15/005 |
| 9,390,554 B2 * | 7/2016 | Goel | G06T 15/005 |
| 9,412,197 B2 * | 8/2016 | Goel | G06T 15/80 |
| 9,442,780 B2 * | 9/2016 | Gruber | G06F 9/52 |
| 9,665,975 B2 * | 5/2017 | Goel | G06T 15/83 |
| 9,679,347 B2 * | 6/2017 | Mei | G06T 1/60 |
| 9,912,957 B1 * | 3/2018 | Surti | G06T 1/20 |
| 10,043,232 B1 * | 8/2018 | Ramadoss | G06T 1/20 |
| 10,108,850 B1 * | 10/2018 | Das | G06K 9/00288 |
| 10,235,811 B2 * | 3/2019 | Bhiravabhatla | G06T 15/20 |
| 2005/0243094 A1 * | 11/2005 | Patel | G06T 15/005 345/506 |
| 2007/0091088 A1 * | 4/2007 | Jiao | G06T 15/005 345/426 |
| 2007/0159488 A1 * | 7/2007 | Danskin | G06T 15/005 345/505 |
| 2007/0285287 A1 * | 12/2007 | Hussain | H03M 7/40 341/50 |
| 2007/0296613 A1 * | 12/2007 | Hussain | H04N 19/61 341/50 |
| 2008/0001952 A1 * | 1/2008 | Srinivasan | G06T 1/20 345/502 |
| 2008/0074430 A1 * | 3/2008 | Jiao | G06T 15/005 345/506 |
| 2008/0094408 A1 * | 4/2008 | Yin | G06T 15/005 345/581 |
| 2008/0143730 A1 * | 6/2008 | Lindholm | G06F 9/5044 345/501 |
| 2008/0266286 A1 * | 10/2008 | Ramey | G06T 15/005 345/419 |
| 2009/0073177 A1 * | 3/2009 | Jiao | G06T 1/60 345/501 |
| 2009/0153570 A1 * | 6/2009 | Jiao | G06T 15/005 345/501 |
| 2009/0189896 A1 * | 7/2009 | Jiao | G06T 1/60 345/426 |
| 2009/0265528 A1 * | 10/2009 | Du | G06F 8/47 712/220 |
| 2009/0295798 A1 * | 12/2009 | Goel | G06T 17/20 345/423 |
| 2009/0300288 A1 * | 12/2009 | Lefebvre | G06F 12/0804 711/128 |
| 2010/0302261 A1 * | 12/2010 | Abdo | G06F 3/00 345/506 |
| 2011/0043518 A1 * | 2/2011 | Von Borries | G06T 11/40 345/419 |
| 2011/0050716 A1 * | 3/2011 | Mantor | G06T 15/005 345/581 |
| 2011/0080415 A1 * | 4/2011 | Duluk, Jr. | G06T 1/20 345/506 |
| 2011/0261063 A1 * | 10/2011 | Jiao | G06F 9/3004 345/522 |
| 2012/0092353 A1 * | 4/2012 | Paltashev | G06T 9/00 345/522 |
| 2012/0200576 A1 * | 8/2012 | Hartog | G06F 9/4881 345/501 |
| 2012/0297163 A1 * | 11/2012 | Breternitz | G06F 9/4856 712/22 |
| 2013/0120380 A1 * | 5/2013 | Kallio | G06T 15/005 345/421 |
| 2013/0155080 A1 * | 6/2013 | Nordlund | G06T 15/005 345/522 |
| 2013/0169634 A1 * | 7/2013 | Goel | G06T 17/20 345/423 |
| 2013/0265307 A1 * | 10/2013 | Goel | G06T 15/80 345/426 |
| 2013/0265309 A1 * | 10/2013 | Goel | G06T 15/80 345/426 |
| 2013/0268942 A1 * | 10/2013 | Duluk, Jr. | G06F 9/4881 718/104 |
| 2013/0293546 A1 * | 11/2013 | Lee | G06T 1/20 345/426 |
| 2013/0328895 A1 * | 12/2013 | Sellers | G06T 1/00 345/522 |
| 2014/0022264 A1 * | 1/2014 | Shreiner | G06T 15/005 345/520 |
| 2014/0043342 A1 * | 2/2014 | Goel | G06T 9/00 345/501 |
| 2014/0092091 A1 * | 4/2014 | Li | G06T 15/60 345/423 |
| 2014/0092092 A1 * | 4/2014 | Li | G06F 9/44 345/423 |
| 2014/0098117 A1 * | 4/2014 | Goel | G06T 1/20 345/522 |
| 2014/0146064 A1 * | 5/2014 | Seetharamaiah | G06T 1/60 345/531 |
| 2014/0152675 A1 * | 6/2014 | Martin | G06T 17/20 345/506 |
| 2014/0184617 A1 * | 7/2014 | Palmer | G06T 1/20 345/506 |
| 2014/0204106 A1 * | 7/2014 | Hakura | G06T 1/60 345/543 |
| 2014/0232729 A1 * | 8/2014 | Hakura | G06T 15/005 345/506 |
| 2014/0267259 A1 * | 9/2014 | Frascati | G06T 15/005 345/423 |
| 2014/0333620 A1 * | 11/2014 | Park | G06T 15/04 345/422 |
| 2014/0354644 A1 * | 12/2014 | Nystad | G06T 1/20 345/426 |
| 2014/0380024 A1 * | 12/2014 | Spadini | G06F 9/3834 712/217 |
| 2015/0002508 A1 * | 1/2015 | Tatarinov | G06T 15/005 345/420 |
| 2015/0015579 A1 * | 1/2015 | Brown | G06T 15/005 345/423 |
| 2015/0042650 A1 * | 2/2015 | Kim | G06T 15/005 345/423 |
| 2015/0054827 A1 * | 2/2015 | Hakura | G06T 1/20 345/423 |
| 2015/0145873 A1 * | 5/2015 | Akenine-Moller | G06T 11/40 345/506 |
| 2015/0178974 A1 * | 6/2015 | Goel | G06T 1/20 345/420 |
| 2015/0235341 A1 * | 8/2015 | Mei | G06T 1/60 345/426 |
| 2015/0279090 A1 * | 10/2015 | Keramidas | G06T 15/503 345/505 |
| 2015/0287239 A1 * | 10/2015 | Berghoff | G06F 9/48 345/422 |
| 2015/0294498 A1 * | 10/2015 | Mei | G06T 1/20 345/420 |
| 2015/0317818 A1 * | 11/2015 | Howson | G06T 15/005 345/424 |
| 2016/0055667 A1 * | 2/2016 | Goel | G06T 15/83 345/522 |
| 2016/0110914 A1 * | 4/2016 | Cho | G06T 15/503 345/426 |

(56) References Cited

U.S. PATENT DOCUMENTS

| | | | |
|---|---|---|---|
| 2016/0133045 A1* | 5/2016 | Akenine-Moller | G06T 11/40 345/421 |
| 2016/0148424 A1* | 5/2016 | Chung | G06T 15/005 345/423 |
| 2016/0155209 A1* | 6/2016 | Kim | G06T 1/20 345/423 |
| 2016/0225118 A1* | 8/2016 | Nevraev | G06T 1/20 |
| 2016/0307297 A1* | 10/2016 | Akenine-Moller | G06T 3/403 |
| 2016/0349832 A1* | 12/2016 | Jiao | G06F 1/3296 |
| 2016/0364829 A1* | 12/2016 | Apodaca | G06T 1/20 |
| 2017/0013269 A1* | 1/2017 | Kim | H04N 19/436 |
| 2017/0024847 A1* | 1/2017 | Engh-Halstvedt | G06T 1/20 |
| 2017/0032488 A1* | 2/2017 | Nystad | G06T 1/20 |
| 2017/0039093 A1* | 2/2017 | Lin | G06F 9/5083 |
| 2017/0053374 A1* | 2/2017 | Howes | G06T 1/20 |
| 2017/0091895 A1* | 3/2017 | Acharya | G06T 1/20 |
| 2017/0091989 A1* | 3/2017 | Ramadoss | G06T 1/20 |
| 2017/0178278 A1* | 6/2017 | Drabinski | G06F 9/328 |
| 2017/0206231 A1* | 7/2017 | Binder | G06F 17/30324 |
| 2017/0206625 A1* | 7/2017 | Fainstain | G06T 1/20 |
| 2017/0286135 A1* | 10/2017 | Cerny | G06F 9/44505 |
| 2017/0286282 A1* | 10/2017 | Simpson | G06F 11/3696 |
| 2017/0293499 A1* | 10/2017 | Che | G06F 9/4552 |
| 2017/0293995 A1* | 10/2017 | Saleh | G06T 1/60 |
| 2017/0345186 A1* | 11/2017 | Seiler | G06T 9/00 |
| 2017/0345207 A1* | 11/2017 | Seiler | G06T 1/20 |
| 2017/0371393 A1* | 12/2017 | Gilani | G06F 15/8007 |
| 2017/0372519 A1* | 12/2017 | Sathe | G06T 1/60 |
| 2018/0033184 A1* | 2/2018 | Jin | G06T 15/005 |
| 2018/0061122 A1* | 3/2018 | Clarberg | G06T 15/80 |
| 2018/0082399 A1* | 3/2018 | Martin | G06T 1/20 |
| 2018/0082464 A1* | 3/2018 | Akenine-Moller | G06T 15/005 |
| 2018/0088989 A1* | 3/2018 | Nield | G06F 9/4881 |
| 2018/0089881 A1* | 3/2018 | Johnson | G06T 15/005 |
| 2018/0096516 A1* | 4/2018 | Luebke | G06T 15/06 |
| 2018/0101980 A1* | 4/2018 | Kwon | G06T 1/20 |
| 2018/0114290 A1* | 4/2018 | Paltashev | G06T 1/20 |
| 2018/0204525 A1* | 7/2018 | Comps | G09G 3/2003 |
| 2018/0211435 A1* | 7/2018 | Nijasure | G06F 9/44 |
| 2018/0232936 A1* | 8/2018 | Nevraev | G06T 15/005 |
| 2018/0246655 A1* | 8/2018 | Schmit | G06F 3/0611 |
| 2018/0276876 A1* | 9/2018 | Yang | G06T 15/30 |
| 2018/0308195 A1* | 10/2018 | Vembu | G06T 1/20 |
| 2018/0314579 A1* | 11/2018 | Sampayo | G06F 11/0772 |
| 2018/0315158 A1* | 11/2018 | Nurvitadhi | G06T 1/20 |
| 2018/0350027 A1* | 12/2018 | Rusin | G06T 1/20 |
| 2019/0087992 A1* | 3/2019 | Clarberg | G06F 9/38 |
| 2019/0087999 A1* | 3/2019 | Maiyuran | G06T 15/005 |
| 2019/0102673 A1* | 4/2019 | Leibovich | G06N 3/08 |
| 2019/0102859 A1* | 4/2019 | Hux | G06T 1/20 |
| 2019/0146714 A1* | 5/2019 | Krishnan | G06F 3/0659 |
| 2019/0146800 A1* | 5/2019 | Ould-Ahmed-Vall | G06F 9/3887 |
| 2019/0147640 A1* | 5/2019 | Surti | G02B 27/017 |

OTHER PUBLICATIONS

Matthias Trapp and Jürgen Döllner: Automated Combination of Real-Time Shader Programs, Jun. 20, 2007, 4 pages.

* cited by examiner

COMBINED WORLD-SPACE PIPELINE SHADER STAGES

CROSS-REFERENCE TO RELATED APPLICATIONS

This application claims priority to pending U.S. Provisional Patent Application Ser. No. 62/398,211, entitled "NEXT GENERATION GRAPHICS," and filed on Sep. 22, 2016, the entirety of which is hereby incorporated herein by reference.

TECHNICAL FIELD

The disclosed embodiments are generally directed to graphics processing pipelines, and in particular, to combined world-space pipeline shader stages.

BACKGROUND

Three-dimensional graphics processing pipelines accept commands from a host (such as a central processing unit of a computing system) and process those commands to generate pixels for display on a display device. Graphics processing pipelines include a number of stages that perform individual tasks, such as transforming vertex positions and attributes, calculating pixel colors, and the like. Graphics processing pipelines are constantly being developed and improved.

BRIEF DESCRIPTION OF THE DRAWINGS

A more detailed understanding may be had from the following description, given by way of example in conjunction with the accompanying drawings wherein.

DETAILED DESCRIPTION

The present disclosure is directed to improvements in the graphics processing pipeline. More specifically, the vertex shader stage, which performs vertex transformations, and the hull or geometry shader stages, are combined. If tessellation is disabled and geometry shading is enabled, then the graphics processing pipeline includes a combined vertex and graphics shader stage. If tessellation is enabled, then the graphics processing pipeline includes a combined vertex and hull shader stage. If tessellation and geometry shading are both disabled, then the graphics processing pipeline does not use a combined shader stage. The combined shader stages improve efficiency by reducing the number of executing instances of shader programs and associated resources reserved.

Figure 1:
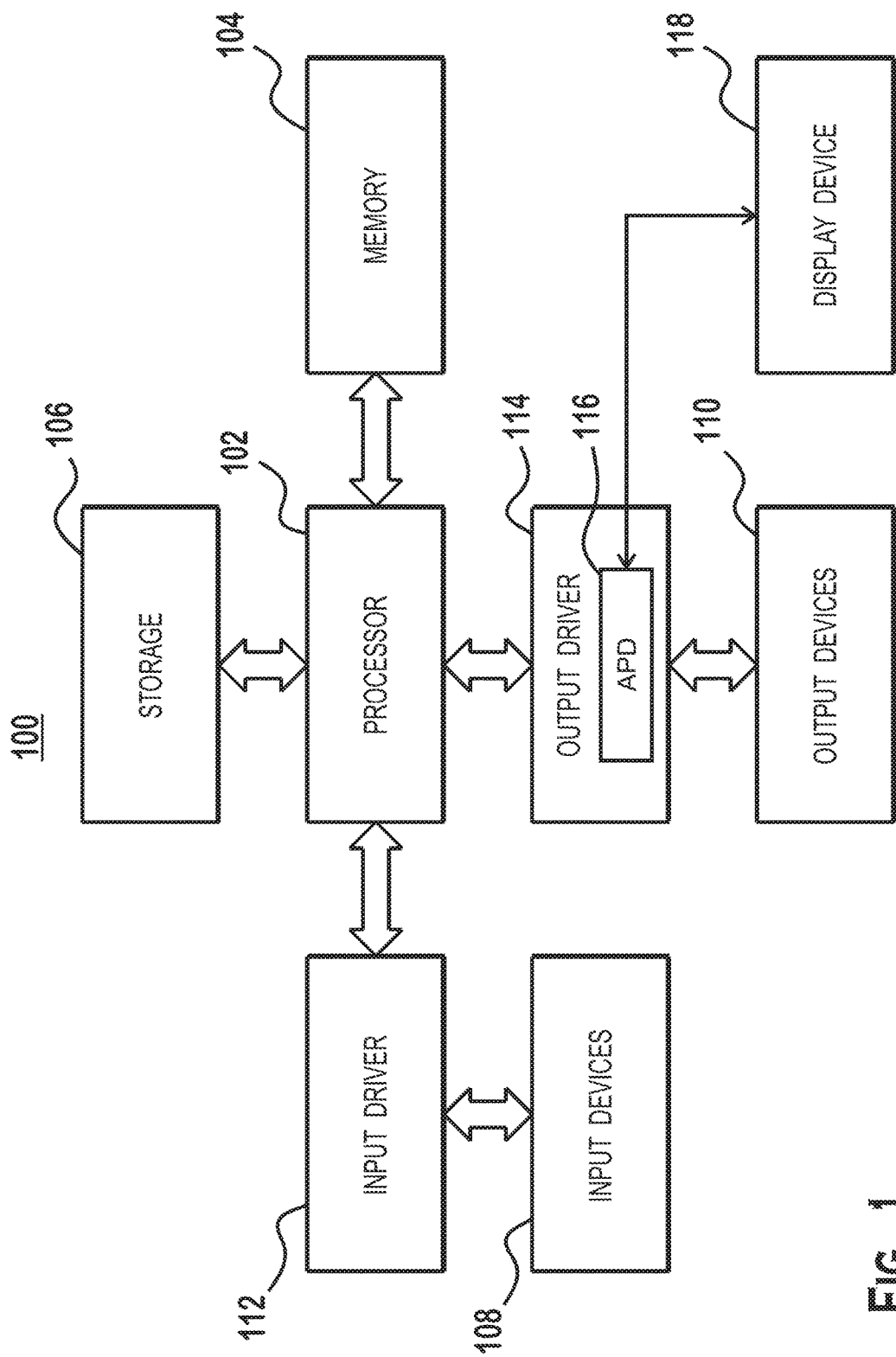
FIG. 1 is a block diagram of an example device in which one or more disclosed embodiments may be implemented.

FIG. 1 is a block diagram of an example device 100 in which one or more aspects of the present disclosure are implemented. The device 100 includes, for example, a computer, a gaming device, a handheld device, a set-top box, a television, a mobile phone, or a tablet computer. The device 100 includes a processor 102, a memory 104, a storage device 106, one or more input devices 108, and one or more output devices 110. The device 100 also optionally includes an input driver 112 and an output driver 114. It is understood that the device 100 may include additional components not shown in FIG. 1.

The processor 102 includes a central processing unit (CPU), a graphics processing unit (GPU), a CPU and GPU located on the same die, or one or more processor cores, wherein each processor core may be a CPU or a GPU. The memory 104 is located on the same die as the processor 102, or may be located separately from the processor 102. The memory 104 includes a volatile or non-volatile memory, for example, random access memory (RAM), dynamic RAM, or a cache.

The storage device 106 includes a fixed or removable storage, for example, a hard disk drive, a solid state drive, an optical disk, or a flash drive. The input devices 108 include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. The output driver 114 includes an accelerated processing device (APD) 116 which is coupled to a display device 118. The APD is configured to accept compute commands and graphics rendering commands from processor 102, to process those compute and graphics rendering commands, and to provide pixel output to display device 118 for display.

The APD 116 includes one or more parallel processing units configured to perform computations in accordance with a single-instruction-multiple-data ("SIMD") paradigm. However, functionality described as being performed by the APD 116 may also be performed by processing devices that do not process data in accordance with a SIMD paradigm.

Figure 2:
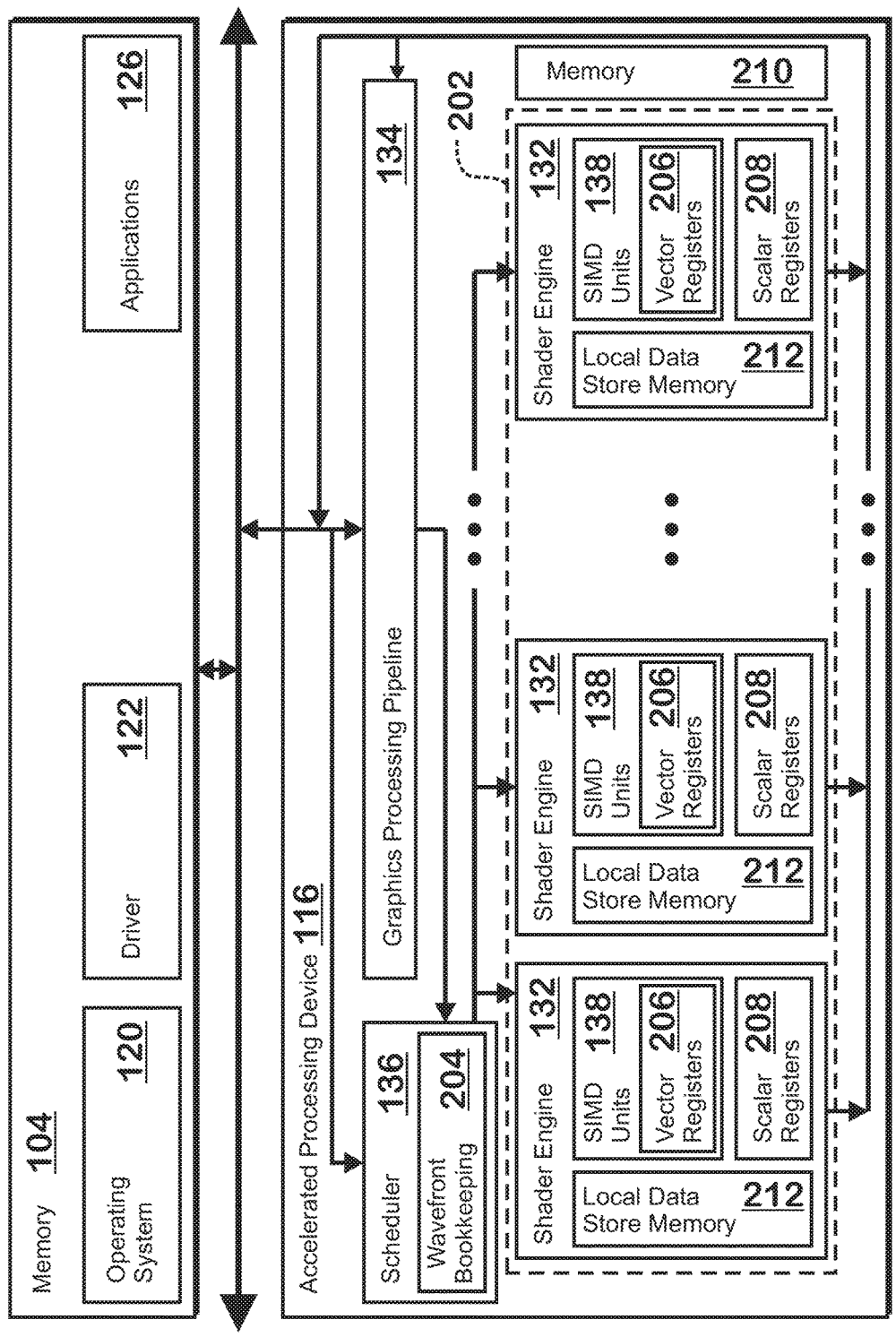
FIG. 2 is a block diagram of the device of FIG. 1, illustrating additional detail.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a driver 122, and applications 126, and may optionally include other modules not shown. These control logic modules control various aspects of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. The driver 122 also includes a just-in-time compiler that compiles shader code into shader programs for execution by processing components (such as the SIMD units 138 discussed in further detail below) of the APD 116.

The APD 116 executes commands and programs for selected functions, such as graphics operations and non-graphics operations, which may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102 or that are not part of the "normal" information flow of a graphics processing pipeline.

The APD 116 includes shader engines 132 (which may collectively be referred to herein as "programmable processing units 202") that include one or more SIMD units 138 that are configured to perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by individual lanes, predication of lanes corresponding to control flow paths not currently being executed, and serial execution of different control flow paths, allows for arbitrary control flow to be followed.

The basic unit of execution in shader engines 132 is a work-item. Each work-item represents a single instantiation of a shader program that is to be executed in parallel in a particular lane. Work-items can be executed simultaneously as a "wavefront" on a single SIMD unit 138. Multiple wavefronts may be included in a "work group," which includes a collection of work-items designated to execute the same program. A work group can be executed by executing each of the wavefronts that make up the work group. The wavefronts may be executed sequentially on a single SIMD unit 138 or partially or fully in parallel on different SIMD units 138. Wavefronts can be thought of as instances of parallel execution of a shader program, where each wavefront includes multiple work-items that execute simultaneously on a single SIMD unit 138 in line with the SIMD paradigm (e.g., one instruction control unit executing the same stream of instructions with multiple data).

SIMD units 138 store working data in vector registers 206, which are configured to store different values for different work-items executing the same instruction in the SIMD units 138 or in scalar registers 208 which are configured to store single values for use, for example, when an instruction in a shader program uses the same operand value for each work-item. A local data store memory 212 in each shader engine 132 also stores values for use by shader programs. The local data store memory 212 may be used for data that cannot fit into the vector registers 206 or scalar registers 208 but which is used by the shader programs. The physical proximity of the local data store memory 212 provides improved latency as compared with other memories such as memory 210 in the APD 116 that is not included within shader engines 132 or memory 104 that is not within the APD 116.

A scheduler 136 is configured to perform operations related to scheduling various wavefronts on different shader engines 132 and SIMD units 138. Wavefront bookkeeping 204 inside scheduler 136 stores data for pending wavefronts, which are wavefronts that have launched and are either executing or "asleep" (e.g., waiting to execute or not currently executing for some other reason). In addition to identifiers identifying pending wavefronts, wavefront bookkeeping 204 also stores indications of resources used by each wavefront, including registers such as vector registers 206 and/or scalar registers 208, portions of a local data store memory 212 assigned to a wavefront, portions of a memory 210 not local to any particular shader engine 132, or other resources assigned to the wavefront.

The parallelism afforded by the shader engines 132 is suitable for graphics related operations such as pixel value calculations, vertex transformations, tessellation, geometry shading operations, and other graphics operations. A graphics processing pipeline 134 which accepts graphics processing commands from the processor 102 thus provides computation tasks to the shader engines 132 for execution in parallel.

The shader engines 132 are also used to perform computation tasks not related to graphics or not performed as part of the "normal" operation of a graphics processing pipeline 134 (e.g., custom operations performed to supplement processing performed for operation of the graphics processing pipeline 134). An application 126 or other software executing on the processor 102 transmits programs (often referred to as "compute shader programs," which may be compiled by the driver 122) that define such computation tasks to the APD 116 for execution.

Figure 3:
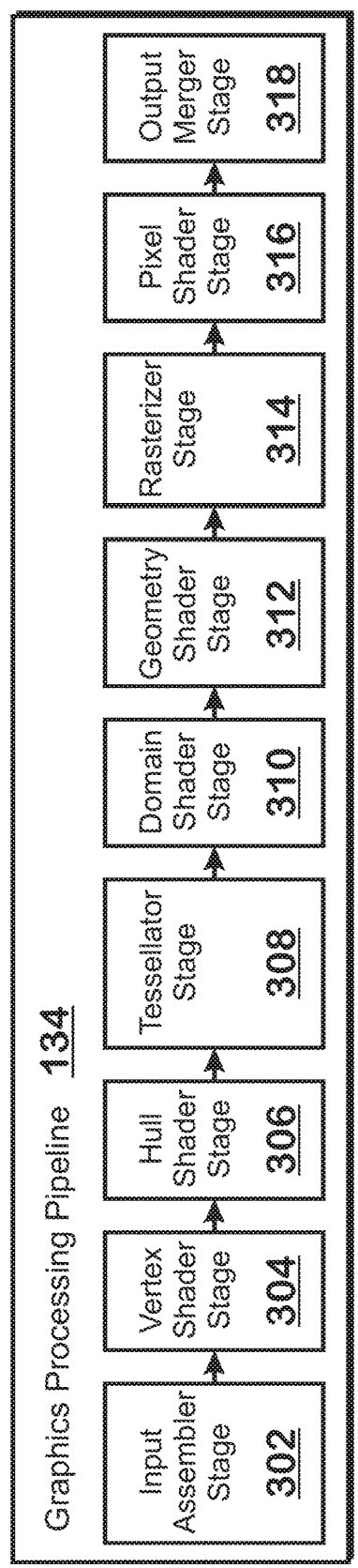
FIG. 3 is a block diagram showing additional details of the graphics processing pipeline illustrated in FIG. 2.

FIG. 3 is a block diagram showing additional details of the graphics processing pipeline 134 illustrated in FIG. 2. The graphics processing pipeline 134 includes stages that each performs specific functionality. The stages represent subdivisions of functionality of the graphics processing pipeline 134. Each stage is implemented partially or fully as shader programs executing in the programmable processing units 202, or partially or fully as fixed-function, non-programmable hardware external to the programmable processing units 202.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertices of the primitives assembled by the input assembler stage 302. The vertex shader stage 304 performs various per-vertex operations such as transformations, skinning, morphing, and per-vertex lighting. Transformation operations may include various operations to transform the coordinates of the vertices. These operations may include one or more of modeling transformations, viewing transformations, projection transformations, perspective division, and viewport transformations. Herein, such transforms are considered to modify the coordinates or "position" of the vertices on which the transforms are performed. Other operations of the vertex shader stage 304 that modify attributes other than the coordinates are considered to modify non-position attributes.

The vertex shader stage 304 is implemented partially or fully as vertex shader programs to be executed on one or more shader engines 132. The vertex shader programs are provided by the processor 102 as programs that are pre-written by a computer programmer. The driver 122 compiles such computer programs to generate the vertex shader programs having a format suitable for execution within the shader engines 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive defined by a set of vertices and other information. The tessellator stage 308 generates a set of samples (which may include vertices specified by barycentric coordinates) for the patch. The domain shader stage 310 calculates vertex positions for the vertices corresponding to the samples for the patch (by, for example, converting the barycentric coordinates to world-space coordinates). The hull shader stage 306 and domain shader stage 310 can be implemented as shader programs to be executed on the programmable processing units 202.

The geometry shader stage 312 performs vertex operations on a primitive-by-primitive basis. Geometry shader programs typically accept whole primitives (e.g., a collection of vertices) as input and perform operations on those whole primitives as specified by the instructions of the geometry shader programs. A variety of different types of operations can be performed by the geometry shader stage 312, including operations such as point sprite expansion, dynamic particle system operations, fur-fin generation, shadow volume generation, single pass render-to-cubemap, per-primitive material swapping, and per-primitive material setup. Operations for the geometry shader stage 312 may be performed by a shader program that executes on the programmable processing units 202.

The rasterizer stage 314 accepts and rasterizes simple primitives generated upstream. Rasterization consists of determining which screen pixels (or sub-pixel samples) are covered by a particular primitive. Rasterization is performed by fixed function hardware or may be performed by shader programs executing in the programmable processing units 202.

The pixel shader stage 316 calculates output values (e.g., color values) for screen pixels based on the primitives generated upstream and the results of rasterization. The pixel shader stage 316 may apply textures from texture memory. Operations for the pixel shader stage 316 are performed by a shader program that executes on the programmable processing units 202.

The output merger stage 318 accepts output from the pixel shader stage 316 and merges those outputs, performing operations such as z-testing and alpha blending to determine the final color for a screen pixel, which are written to a frame buffer for output to the display device 118.

As described above, many of the stages illustrated in FIG. 3 and described as being included within the graphics processing pipeline 134 can be implemented as shader programs executing within the shader engines 132 illustrated in FIG. 2. Various operations occur in the driver 122 and within the APD 116 to facilitate executing shader programs in the shader engines 132.

One such operation involves facilitating shader input and output data transfer. More specifically, the stages of the graphics processing pipeline 134 typically obtain input data, perform some processing on that input data, and provide output data in response, usually for the next stage of the graphics processing pipeline 134. Shader programs that execute as part of the graphics processing pipeline 134 include instructions or "hints" to the APD 116 that specify inputs and outputs for the shader programs. These hints inform the APD 116 regarding where (e.g., which registers) to place inputs for particular shader programs and where (e.g., which registers) to retrieve outputs from for particular shader programs. This input and output information is used, at least in part, to instruct the APD 116 regarding where to place inputs for a particular shader program and also where to fetch the outputs from for a particular shader program, in order to forward the output data to other parts of the graphics processing pipeline 134 such as fixed function hardware or other shader programs. In one example, a vertex shader program specifies locations (e.g., registers) at which inputs are expected. The APD 116 fetches inputs and places the inputs at those locations. The vertex shader program performs vertex shading operations on the input vertices, and provides modified vertices as output. The APD 116 fetches these modified vertices and places those vertices at the locations (e.g., registers) specified as inputs by the next stage of the graphics processing pipeline 134.

Another operation for facilitating execution of shader programs involves reserving resources for wavefronts that are to execute a shader program (e.g., entries in wavefront bookkeeping 204, registers to be used by the wavefronts, portions of local data store memory 212, memory 210, and other memory, as well as other resources to be used by wavefronts) prior to launching the wavefronts to execute the shader program. The quantity of resources to be reserved for wavefronts for a particular shader program are based at least partially on the instructions of the shader programs. More specifically, shader programs typically include instructions, each of which can specify particular registers to use as operands. The APD 116 determines a number of registers to reserve for a wavefront based on the registers specified in the instructions of a shader program that the wavefront is to execute. In one example, ten different vector registers are specified by a particular wavefront that is to execute with 64 work items. Thus the APD 116 determines that 10×64=640 registers need to be reserved to execute that wavefront. Similarly, instructions may specify locations in memory as operands. The APD 116 determines a total amount of memory to reserve for a wavefront based on the memory locations specified by the instructions of the shader program. Other resources required for wavefronts are also reserved based on the characteristics of the shader programs that the wavefronts are to execute.

Another operation that occurs to prepare wavefronts to execute includes receiving an indication that wavefronts from a prior shader stage has completed execution. More specifically, some shader stages are dependent on other shader stages. For example, if tessellation (which involves the hull shader stage 306, tessellator stage 308, and domain shader stage 310) is enabled, then the hull shader stage 306 is dependent on the results from the vertex shader stage 304 to execute. Thus, wavefronts that are to execute hull shader programs on a particular set of vertices wait for the wavefronts executing a vertex shader program on those same vertices to complete. This "handoff" is typically facilitated by the scheduler 136, which receives notifications that particular wavefronts are complete and launches wavefronts for subsequent stages in response.

The above operations illustrate that each stage of the graphics processing pipeline 134 that is implemented at least partially via shader programs is associated with some amount of overhead. For example, different wavefronts are launched for different shader program types (e.g., one type of wavefront is launched to execute a vertex shader program and another type of wavefront is launched to execute a hull shader program). Thus, a larger number of shader stages is generally associated with a greater number of wavefronts that are tracked by the scheduler 136. Other overhead involves overhead related to transferring data between shader stages, and overhead related to the amount of resources that are reserved for each different shader program type. For this reason, combining certain shader stages could help to reduce such overhead and improve performance. Two shader stages that can be combined are the vertex and hull shader stages and the vertex and geometry shader stages.

Figure 4A:
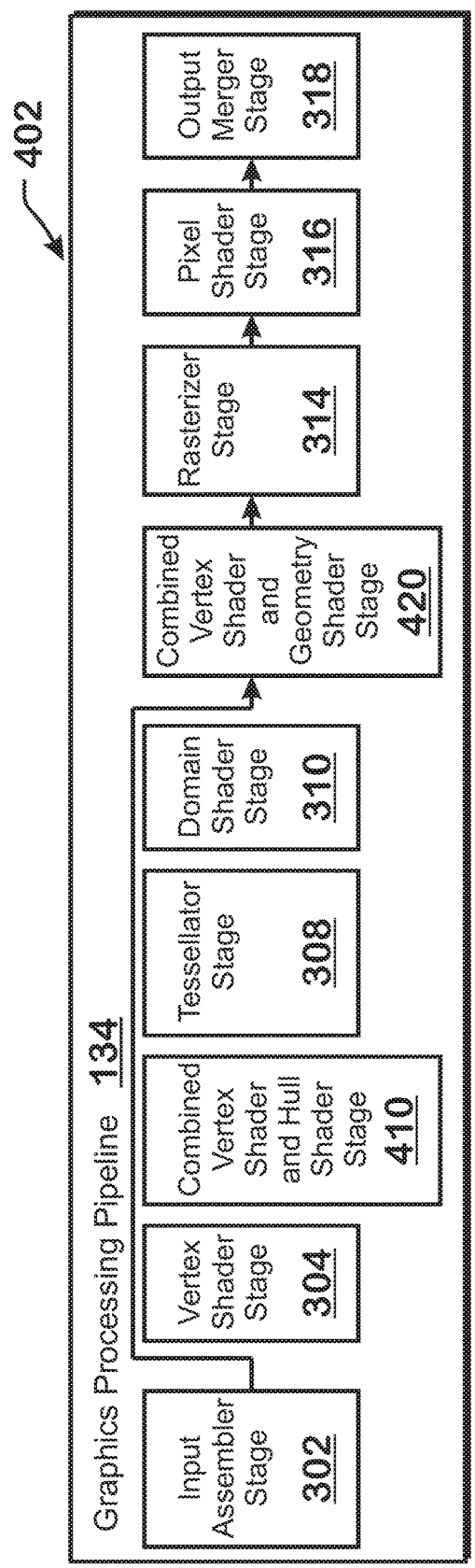
FIGS. 4A and 4B illustrate configurations for the graphics processing pipeline, according to examples.
Figure 4B:
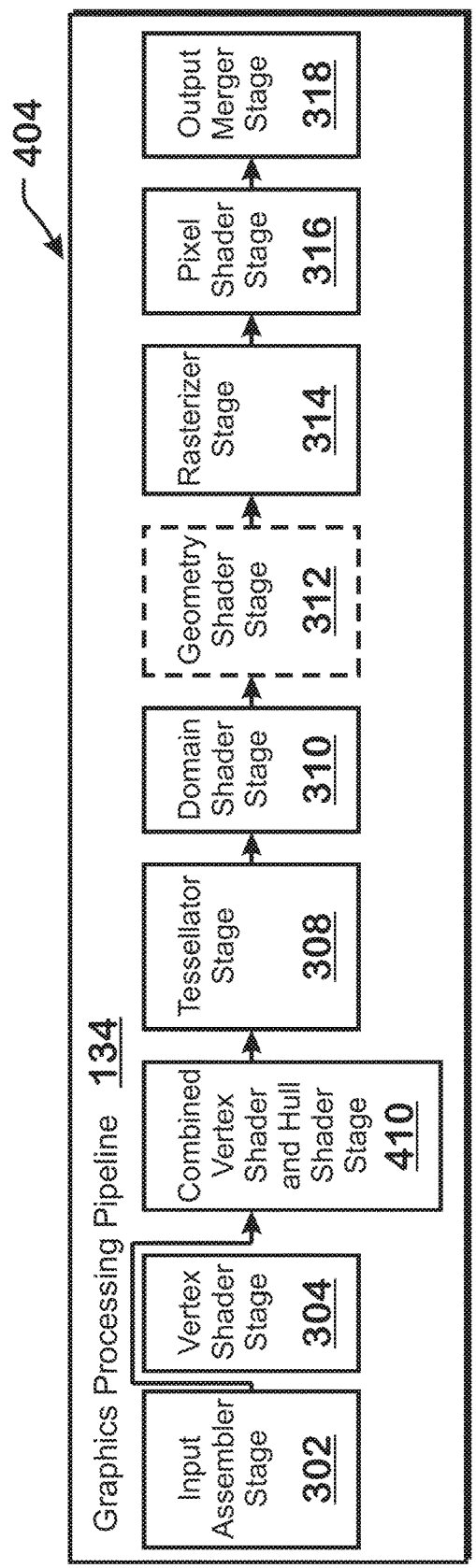

FIGS. 4A and 4B illustrate configurations for the graphics processing pipeline, according to examples. These alternative configurations include the configuration of FIG. 4A, in which the vertex shader stage and geometry shader stage 420 are combined into a single shader stage—the combined vertex shader and geometry shader stage 420—and the configuration of FIG. 4B, in which the vertex shader stage and hull shader stage 306 are combined into a single shader stage—the combined vertex shader and hull shader stage 410. Herein, the configuration of the graphics processing pipeline 134 illustrated in FIG. 4A is referred to as the "vertex/geometry shader configuration 402" and the configuration of the graphics processing pipeline 134 illustrated in FIG. 4B is referred to as the "vertex/hull shader configuration 404."

Various stages of the graphics processing pipeline 134 can be enabled or disabled. Specifically, geometry shading, which is implemented by the geometry shader stage 312, can be enabled or disabled, and the stages implementing tessellation (the hull shader stage 306, the tessellator stage 308, and the domain shader stage 310) can be enabled or disabled together. If both tesselation and geometry shading are disabled, then neither of the configurations illustrated in FIGS. 4A and 4B are used. In both FIGS. 4A and 4B, a disabled stage is indicated with an arrow that flows around the disabled stage to a subsequent stage in the graphics processing pipeline 134. If geometry shading is enabled and tessellation is disabled, then the vertex/geometry shader configuration 402 of FIG. 4A is used. If tessellation is enabled (and regardless of whether geometry shading is enabled), then the vertex/hull shader configuration 404 of FIG. 4B is used (the geometry shader stage 312 is illustrated with dotted lines, indicating that use of that stage is optional).

"Combining" two shader stages means that the shader programs for the two shader stages are combined (e.g., by the driver 122) into a single shader program and wavefronts are launched to execute the combined shader program. More specifically, instead of launching wavefronts of a first type to execute vertex shader programs and launching wavefronts of a second type to execute hull or geometry shader programs, the APD 116 launches wavefronts of a single type—a combined vertex and hull or geometry shader type—to execute a combined shader program for the combined pipeline stage. This combining involves several operations and/or modifications to the APD 116 and graphics processing pipeline 134, including modifying inputs and outputs that the shader programs declare, modifying the manner in which wavefronts execute in the APD 116, modifying the manner in which resources are allocated for the different shader programs, and other operations described herein.

Figure 5A:
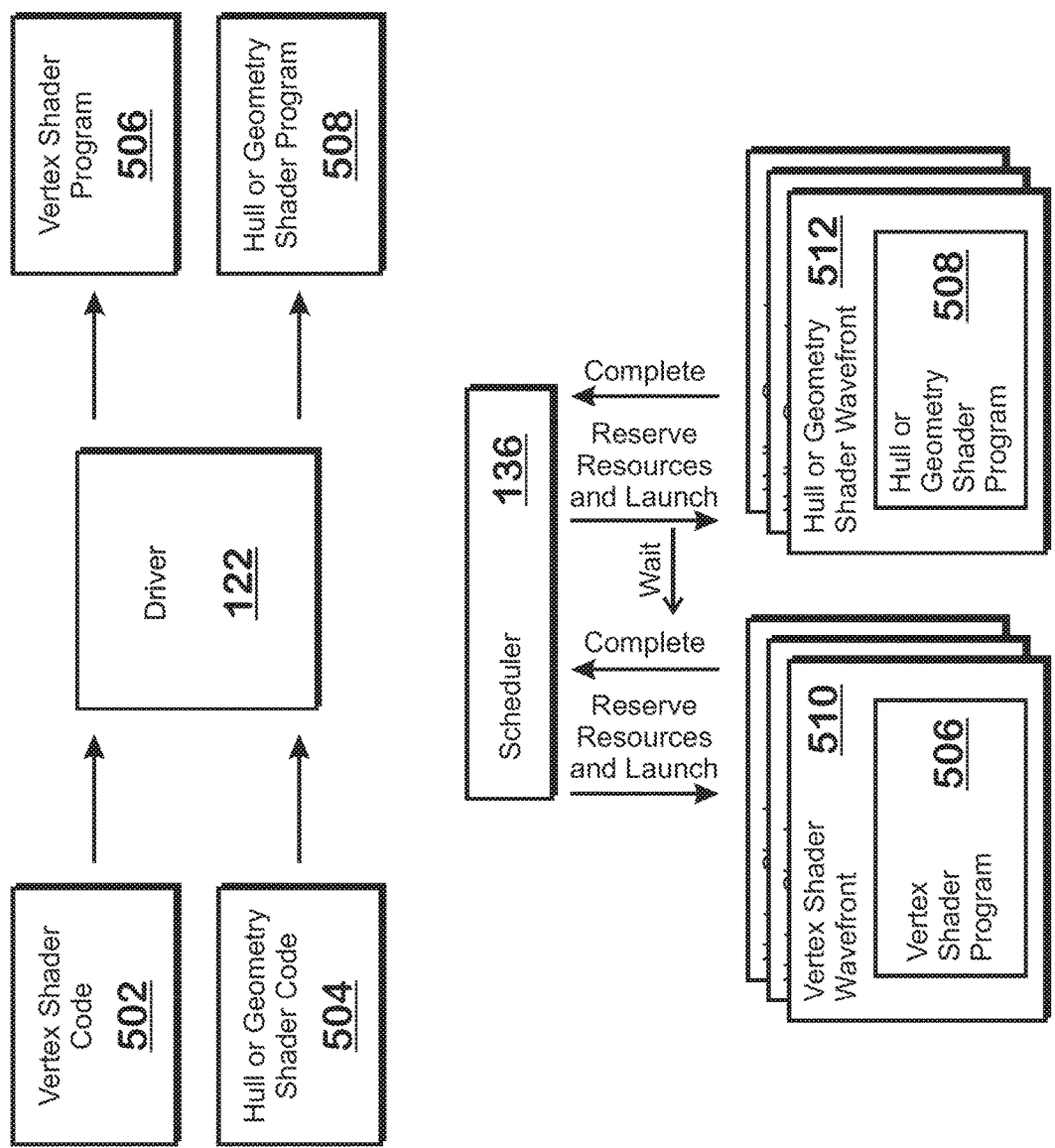
FIGS. 5A and 5B illustrate aspects of combined shader stages involving the driver and the scheduler illustrated in FIG. 2, according to examples.
Figure 5B:
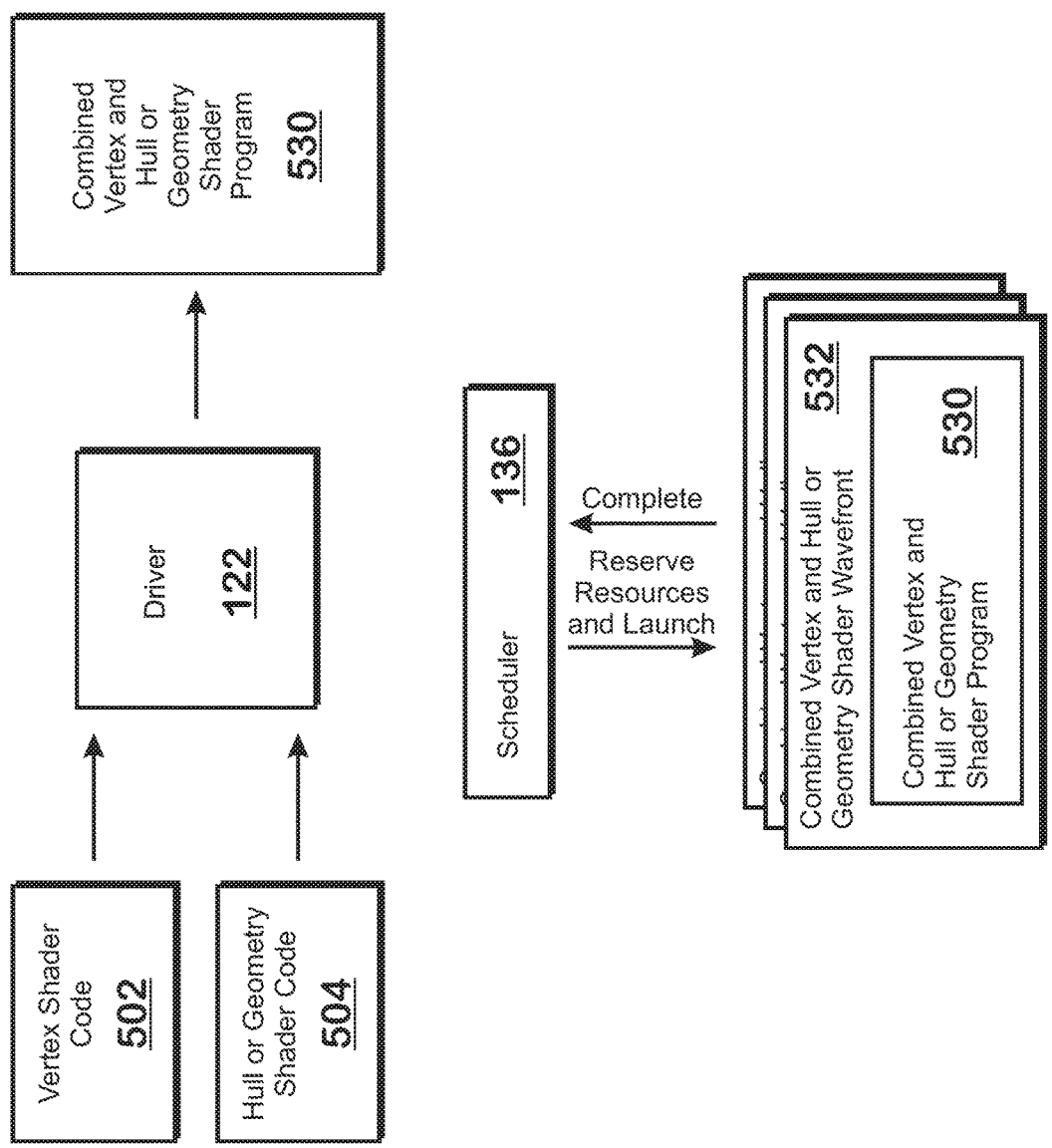

FIGS. 5A and 5B illustrate aspects of combined shader stages involving the driver 122 and the scheduler 136 illustrated in FIG. 2, according to examples. For purposes of comparative illustration, FIG. 5A illustrates uncombined shader stages and FIG. 5B illustrates combined shader stages.

In FIG. 5A, the driver 122 receives vertex shader code 502 and hull or geometry shader code 504 from hardware or software requesting such shader code to be executed on the APD 116 as part of the vertex shader stage 304 and the hull shader stage 306 or geometry shader stage 312. The hull or geometry shader code 504 represents either geometry shader code or hull shader code.

In response to receiving the vertex shader code 502 and the hull or geometry shader code 504, the driver 122 compiles the vertex shader code 502 to generate a vertex shader program 506 and compiles the hull or geometry shader code 504 to generate a hull or geometry shader program 508. Techniques for compiling shader programs provided to a driver 122 (by, e.g., and application 126) generally comprise converting programs specified in a high level language such as AMD Intermediate Language to lower level instructions that are more tied to the hardware and that are understood by the APD 116.

In the APD 116, the scheduler 136 obtains the compiled vertex shader program 506 and hull or geometry shader program 508 executes those shader programs. Part of this execution involves identifying and reserving resources needed for the shader programs. Another part of this execution involves launching wavefronts to execute the shader programs. Yet another part of this execution involves coordinating wavefront execution between different stages of the pipeline (in other words, making sure that wavefronts for a later stage waits for execution of wavefronts of an earlier stage to execute before completing, where execution in the later stage is dependent on results of the earlier stage).

These aspects of execution are illustrated in FIG. 5A. The scheduler 136 reserves resources and launches vertex shader wavefronts that execute vertex shader programs. The scheduler 136 then waits for "complete" signals for the outstanding vertex shader wavefronts 510. Upon receiving the "complete" signals, the scheduler 136 reserves resources for and launches the hull or geometry shader wavefronts 512 to execute the hull or geometry shader programs 508. As described above, resources include registers, memory, tracking resources for tracking execution of the wavefronts, and other resources.

FIG. 5B illustrates the combined shader stages. For these combined shader stages, the driver 122 receives the vertex shader code 502 and hull or geometry shader code 504 (from, e.g., an application 126) and compiles these different portions of code into a single combined vertex and hull or geometry shader program 530. The hull or geometry shader code 504 represents either geometry shader code for a configuration of the graphics processing pipeline 134 in which tessellation is disabled but geometry shading is enabled (FIG. 4A) or hull shader code for a configuration of the graphics processing pipeline 134 in which tessellation is disabled (FIG. 4B).

To combine shader stages, the driver 122 compiles the vertex shader code 502 and hull or geometry shader code 504 to generate compiled shader programs and "stitches" the compiled shader programs together. Stitching the two shader programs together means that the two shader programs are concatenated and then the combination is modified as appropriate.

One way in which the concatenated shader programs are modified relates to the inputs and outputs defined for the shader programs. More specifically, each shader program defines inputs and outputs to the shader programs. These defined inputs and outputs act as hints to the APD 116. When a wavefront is to begin execution of a shader program, the APD 116 ensures that the values indicated as inputs are placed in locations (e.g., registers) specified by the shader program. When a wavefront completes execution, the APD 116 retrieves the data from the locations (e.g., registers) indicated as storing the outputs. The APD 116 may copy that data to other locations (e.g., registers) for shader programs in subsequent shader stages that use the output data. For example, for the graphics processing pipeline 134 illustrated in FIG. 3, the APD 116 copies shaded vertices from locations specified as outputs in vertex shader programs executed in the vertex shader stage 304 to locations specified as inputs for hull shader programs to execute in the hull shader stage 306.

The vertex shader code 502 defines outputs and the hull or geometry shader code 504 defines inputs. However, because the combined vertex and hull or geometry shader program 530 is a single shader program, instead of two separate shader programs, the defined outputs of the vertex shader code 502 and the defined inputs of the hull or geometry shader code 504 do not need to be explicitly "handled" by the APD 116. More specifically, because these defined inputs and outputs are hints to the APD 116 regarding the manner in which to transfer data between shader programs executing at different stages of the graphics processing pipeline 134, these defined inputs and outputs are not needed in the combined vertex and hull or geometry shader program 530. Thus, the driver 122 removes the defined outputs of the vertex shader code 502 and the defined inputs of the hull or geometry shader code 504 in creating the combined vertex and hull or geometry shader program 530. The driver 122 also modifies the instructions of the hull or geometry shader code 504 that read from inputs to instead read from locations in which outputs of the vertex shader code 502 are placed. For example, if certain registers would be indicated as storing outputs for the vertex shader code and certain registers would be indicated as storing inputs for the hull or geometry shader code, then the driver 122 modifies the instructions of the hull or geometry shader code to read from the registers indicated as storing outputs for the vertex shader code, instead of reading from registers indicated as storing inputs for the hull or geometry shader code.

In order to launch wavefronts to execute shader programs, the scheduler 136 reserves resources for those wavefronts. The resources include portions of various memory units, registers (such as vector registers 206 and scalar registers 208), entries in the wavefront bookkeeping 204 to keep track of the wavefronts, and other resources. The resources reserved for the combined vertex and hull or geometry shader program 530 differ from resources that would be reserved for independent vertex shader programs and hull or geometry shader programs in several ways. The number of wavefronts actually launched is different. The number of wavefronts to be launched for an independent vertex shader is dependent on the number of vertices 610 to be shaded. The number of wavefronts to be launched for an independent hull or geometry shader is dependent on the number of patches (hull) or primitives (geometry) to be shaded. However, the number of wavefronts launched for the combined vertex and hull or geometry shader program 530 is less than the total number of wavefronts to launch for independent vertex shader programs and hull or geometry shader programs. This is because the combined shader program has instructions for both shader programs. Thus at least some of the combined shader programs that execute instructions for the vertex shader stage will also execute instructions for the hull or geometry shader stage.

In one example, the number of combined shader stage wavefronts to launch is based on the number of vertices to be processed in the vertex shader stage. More specifically, a number of work-items to launch is equal (or approximately equal) to the number of vertices 610 to process at the vertex shader stage. The number of wavefronts is based on the number of work-items to launch since each wavefront executes instructions for a fixed number of work-items. Additionally, because hull or geometry shader programs perform work on a collection of vertices 614, the number of work-items for processing vertices 610 in the vertex shader stage is greater than the number of work-items for performing hull or geometry shader operations. Further, the combined shader programs include instructions for both the vertex shader stage and the hull or geometry shader stage. Thus, at least some of the launched combined shader programs will execute instructions for both the vertex shader stage and the hull or geometry shader stage. For this reason, the number of combined shader wavefronts to launch is based on the number of vertices 610 to process in the vertex shader stage and is not based on the number of patches or primitives to process in the hull or geometry shader stage.

In addition, some of the registers or memory locations used for the vertex shader instructions are reused for the hull or geometry shader instructions. Thus, whereas independently executing wavefronts for vertex shader programs and hull or geometry shader programs would have to reserve registers and memory for the respective shader programs, a combined shader program can reserve less memory and registers. In some examples, the amount of resources to reserve for the combined vertex and hull or geometry shader program 530 is, for each particular resource, the maximum of either the number of resources required by the vertex shader code 502 or the hull or geometry shader code 504. For example, if the vertex shader code needs 4 registers and the hull or geometry shader code 504 needs 8 registers, then the scheduler 136 reserves 8 registers. If the vertex shader code needs 100 bytes in the local data store memory 212 and the hull or geometry shader code needs 200 bytes in the local data store memory 212, then the scheduler 136 reserves 200 bytes. In addition, using the combined shader stages allows for a smaller amount of latency because stage-to-stage data is kept local to an execution unit. Thus, the latency associated with transmitting the data for a stage to an external memory unit for a first stage and then reading the data back in for a second stage is reduced.

Figure 6:
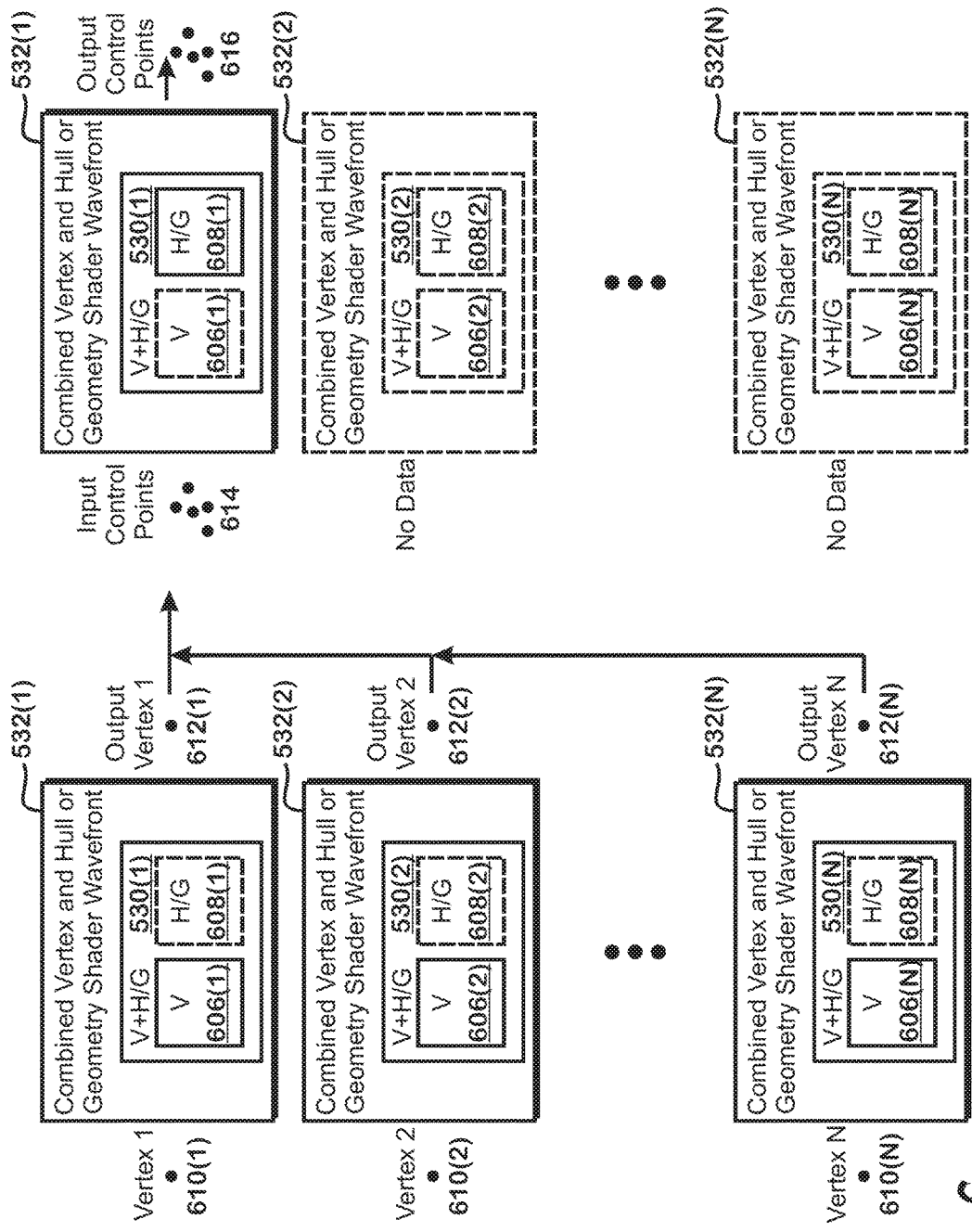
FIG. 6 illustrates operations for enabling or disabling wavefronts for the combined vertex and hull or geometry shader stage in order to accommodate that change in workload at the boundary between shader stages, according to an example.

FIG. 6 illustrates operations for enabling or disabling wavefronts for the combined vertex and hull or geometry shader stage in order to accommodate that change in workload at the boundary between shader stages, according to an example. More specifically, FIG. 6 illustrates a number of combined vertex and hull or geometry shader wavefronts 532 executing either a combined vertex and geometry shader program for the configuration of FIG. 4A or a combined vertex and hull shader program for the configuration of FIG. 4B (where this combined shader program is illustrated as V+H/G 530). The combined shader programs 530 include vertex shader portions 606 and hull or geometry shader portions 608. The vertex shader portions 606 accept vertices 510 as inputs and output shaded vertices 612 to the hull/geometry shader portions 608. The hull/geometry shader portions 608 accept the shaded vertices as input control points 614, and outputs output control points 616 in response. Note that because the shaded output vertices 612 are gathered together for processing to generate output patches, the number of wavefronts for the hull/geometry shader portion 608 is less than the number of vertices 614 for shading vertices by the vertex shader portion 606.

To accommodate this variation, a number of combined vertex and hull or geometry shader wavefronts 532 are launched in order to process the vertices identified for shading by the vertex shader stage. The combined shader wavefronts 532 are configured to have a changing execution footprint while executing. A "changing execution footprint" means that a different number of wavefronts 532 will execute for the vertex shader portion 506 as compared with the hull or geometry shader portion 608. More specifically, vertex shader programs perform vertex shading operations for individual vertices. Although multiple instances of vertex shader programs corresponding to different work-items are executed in parallel on the programmable processing units 202, each individual work-item operates independently on only a single vertex of data, performing whatever transformations and other operations are specified for that vertex of data.

However, hull shader programs or geometry shader programs operate on multiple vertices of data (e.g., a collection of input control points for a hull shader or a collection of vertices for a geometry shader). More specifically, each work-item accepts multiple vertices as input control points and outputs a patch as multiple output control points. Because hull shader programs and geometry shader programs operate on multiple vertices, the overall number of work-items for performing hull shader and geometry shader operations is generally lower than the number of work-items for performing vertex shader operations.

Because of the difference in ratio between vertex shader work-items and hull shader or geometry shader work-items, many of the wavefronts 532 launched to execute the combined shader program are not in fact needed for the hull shader or geometry shader portion. Unneeded wavefronts are therefore put to sleep or terminated after executing the vertex shader portion 606. Putting the wavefronts 532 to sleep means continuing to track the wavefronts 532, storing state for the wavefronts 532 in memory, and the like, but not scheduling the sleeping wavefronts 532 for execution on any of the SIMD units 138. Terminating the wavefronts 532 means ending execution of the wavefronts 532 and discarding tracking data for the terminated wavefronts 532 that may be stored, for example, in wavefront bookkeeping 204.

In FIG. 6, the left side of the figure illustrates the combined wavefronts 532 executing the vertex shader portion 606 and the right side of the figure illustrates the combined wavefronts 532 executing the hull or geometry shader portion 608 (inactive portions are illustrated with dotted lines). The right side of the figure illustrates the combined wavefronts 532 executing the hull or geometry shader program 508, with inactive wavefronts 532 and portions of shader programs indicated with dotted lines. Once the vertex shader portion 506 has been executed by the wavefronts 532, the APD 116 disables many of the wavefronts 532, which do not execute the hull or geometry shader portion 608. In the example of FIG. 6, wavefront 532(1) executes the hull or geometry shader portion 608 and wavefronts 532(2)-532(N) are disabled. In other examples, however, different numbers of wavefronts may be enabled and disabled for execution of the hull or geometry shader portion 608.

Each wavefront 532 that is not disabled gathers shaded vertices (as input control points 614) produced by multiple wavefronts 532 executing the vertex shader portion 606. This "gathering" can be accomplished by specific instructions inserted by the driver 122 into the combined shader program 530. More specifically, the driver 122 can insert an instruction that reads from the locations of the modified vertices as specified for multiple wavefronts 532 in the vertex shader portion 606.

To ensure that the hull or geometry shader portion 608 of the combined shader program has all of the input control points 614 from the vertex shader portions 606, the driver 122 inserts a barrier instruction between the vertex shader portion 606 and the hull or geometry shader portion 608 when generating the combined vertex and hull or geometry shader program 530. The barrier instruction causes processing in the hull or geometry shader portion 608 to wait to execute until the wavefronts producing the data for the hull or geometry shader portion 608 have finished executing the vertex shader portion 606.

FIG. 6 shows transition from vertex to hull or geometry portions of the combined shader program 530 and the corresponding disabling of wavefronts. It should be understood, however, that the combined vertex and hull or geometry shader programs 530 may include many transitions that cause various wavefronts to sleep and wake up.

In another example, variation in workload within the combined vertex and hull or geometry shader program 530 is accommodated by enabling or disabling work-items within the wavefronts. More specifically, each wavefront performs work on a set of vertices, and then the same wavefront performs work on a set of primitives. Because each work-item works on a single vertex for vertex operations and on a single primitive for primitive operations, generally speaking, the number of work-items for primitive processing is less than the number of work-items for vertex processing. To accommodate this difference, the wavefront disables unneeded work-items, with the remaining work-items performing the primitive operations.

Figure 7:
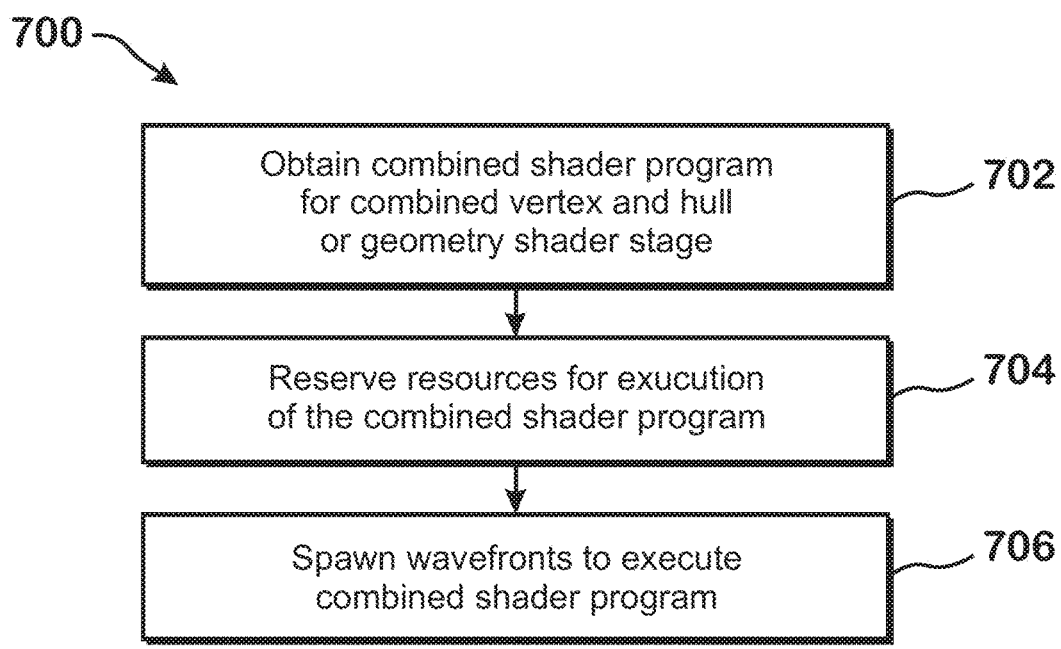
FIG. 7 is a flow diagram of a method for executing a combined vertex and hull or geometry shader program for a combined vertex and hull or geometry shader stage, according to an example

FIG. 7 is a flow diagram of a method 700 for executing a combined vertex and hull or geometry shader program for a combined vertex and hull or geometry shader stage, according to an example. Although described with respect to the system shown and described with respect to FIGS. 1-6, it should be understood that any system configured to perform the method, in any technically feasible order, falls within the scope of the present disclosure.

As shown, the method 700 begins at step 702, where the APD 116 obtains a combined shader program for a combined vertex and hull or geometry shader stage. The combined shader program may be generated by a driver 122 based on vertex shader code and hull shader code or geometry shader code received from, e.g., an application 126. More specifically, the driver 122 compiles the vertex shader code and hull shader code or geometry shader code to generate vertex and hull or geometry shader compiled instructions and combines the vertex and hull or geometry shader instructions into a single combined shader program. The driver 122 may modify aspects of the individual shader programs, such as the specified outputs for the vertex shader code and the specified inputs for the hull shader code or geometry shader code.

At step 704, the APD 116 reserves resources for execution of the combined shader program. Reserved resources include memory, such as registers and memory in a local data store memory 212, entries in wavefront bookkeeping 204 for tracking executing wavefronts, and other resources. The number of resources reserved for the combined shader program may be less than the number of resources reserved for individual vertex and hull or geometry shader programs because some such resources (e.g., registers, memory) can be reused from the vertex shader portion of the combined shader program to the hull or geometry shader portion of the combined shader program.

At step 706, the APD 116 spawns and launches wavefronts to execute the combined shader program. Each wavefront executes the combined shader program, which includes instructions that are based on both the vertex shader code and the hull or geometry shader code. The number of wavefronts launched is based on the greater of the number of wavefronts to execute the vertex shader code and the number of wavefronts to execute the hull or geometry shader code. Typically, more wavefronts are used to execute vertex shader code, so the number of wavefronts spawned is dependent on the number of vertices to process in the vertex shader portion of the combined shader program.

A method of executing a shader program for a combined shader stage of a graphics processing pipeline is provided. The method includes retrieving a combined shader program for the combined shader stage, reserving resources for a plurality of wavefronts to execute the combined shader program, and spawning the plurality of wavefronts to execute the combined shader program. The combined shader stage includes one of a combined vertex shader stage and hull shader stage and a combined vertex shader stage and geometry shader stage.

An accelerated processing device (APD) for executing a shader program for a combined shader stage of a graphics processing pipeline is provided. The APD includes a plurality of shader engines including registers and local data store memory and a scheduler. The scheduler is configured to retrieve a combined shader program for the combined shader stage, reserve resources for a plurality of wavefronts to execute the combined shader program in the plurality of shader engines, and spawning the plurality of wavefronts to execute the combined shader program in the plurality of shader engines. The combined shader stage includes one of a combined vertex shader stage and hull shader stage and a combined vertex shader stage and geometry shader stage.

A computer system for executing a shader program for a combined shader stage of a graphics processing pipeline is provided. The computer system includes a processor executing a device driver for controlling an accelerated processing device (APD) and the APD. The APD includes a plurality of shader engines including registers and local data store memory and a scheduler. The scheduler is configured to receive a combined shader program for the combined shader stage from the device driver, reserve resources for a plurality of wavefronts to execute the combined shader program in the plurality of shader engines, and spawn the plurality of wavefronts to execute the combined shader program in the plurality of shader engines. The combined shader stage includes one of a combined vertex shader stage and hull shader stage and a combined vertex shader stage and geometry shader stage.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method of executing a shader program for a combined shader stage of a graphics processing pipeline, the method comprising:

retrieving a combined shader program for the combined shader stage, wherein the combined shader stage includes one of a combined vertex shader and hull shader stage and a combined vertex shader and geometry shader stage, the combined shader program including instructions from a vertex shader program and either a hull shader program or a geometry shader program;

for a first primitive for which tessellation is disabled and geometry shading is enabled, configuring the graphics processing pipeline in a vertex shader/geometry shader configuration, in which a vertex shader stage and stages for tessellation, including the combined vertex and hull shader stage, are bypassed;

for a second primitive, for which tessellation is enabled, configuring the graphics pipeline in a vertex/hull shader configuration, in which the vertex shader stage is bypassed, and in which the combined vertex shader and geometry shader stage does not process the second primitive; and spawning a number of wavefronts to execute the combined shader program.

2. The method of claim 1, wherein the combined shader program comprises a single shader program that includes instructions from both a vertex shader program and either a hull shader program or a geometry shader program.

3. The method of claim 2, wherein:
the vertex shader program specifies vertex shader outputs that indicate to graphics processing hardware locations of vertex shader output values to transfer to a subsequent stage in the graphics processing pipeline; and
the combined shader program does not include the vertex shader outputs.

4. The method of claim 2, wherein reserving the resources comprises:
selecting a greater number of registers of a first number of registers for executing the vertex shader program and a second number of registers for executing either the hull shader program or the geometry shader program; and
reserving the greater number of registers.

5. The method of claim 2, further comprising:
receiving an indication of a number of vertices to be processed by a vertex shader portion of the combined shader stage and either a number of patches to be processed by the hull shader stage or a number of primitives to be processed by the geometry shader stage; and
determining a number of wavefronts for processing the number of vertices by the vertex shader portion of the combined shader stage,
wherein spawning the number of wavefronts to execute the combined shader program comprises spawning the determined number of wavefronts to execute the combined shader program.

6. The method of claim 5, further comprising:
disabling one or more of the wavefronts based on a ratio of a first number of work-items to execute the vertex shader program and a second number of work-items to execute either the hull shader program or the geometry shader program,
wherein disabling comprises one of causing the one or more of the wavefronts to sleep or terminating the one or more wavefronts.

7. The method of claim 1, wherein:
the combined shader program includes a barrier instruction between a vertex shader portion and either a hull shader portion or a geometry shader portion, and
the barrier instruction causes processing in the vertex shader portion to wait to begin until processing in the hull shader portion or geometry shader portion is complete.

8. The method of claim 1, further comprising:
reserving resources for a number of wavefronts to execute the combined shader program, the number of wavefronts being the greater of a number of wavefronts to execute instructions from the vertex shader program and instructions from the hull shader program or geometry shader program.

9. An accelerated processing device (APD) for executing a shader program for a combined shader stage of a graphics processing pipeline, the APD comprising:
a plurality of shader engines including registers and local data store memory; and
a scheduler configured to:
retrieve a combined shader program for the combined shader stage, wherein the combined shader stage includes one of a combined vertex shader and hull shader stage and a combined vertex shader and geometry shader stage, the combined shader program including instructions from a vertex shader program and either a hull shader program or a geometry shader program;
for a first primitive for which tessellation is disabled and geometry shading is enabled, configure the graphics processing pipeline in a vertex shader/geometry shader configuration, in which a vertex shader stage and stages for tessellation, including the combined vertex and hull shader stage, are bypassed;
for a second primitive, for which tessellation is enabled, configure the graphics pipeline in a vertex/hull shader configuration, in which the vertex shader stage is bypassed, and in which the combined vertex shader and geometry shader stage does not process the second primitive; and
spawning a number of wavefronts to execute the combined shader program in the plurality of shader engines.

10. The APD of claim 9, wherein the combined shader program comprises a single shader program that includes instructions from both a vertex shader program and either a hull shader program or a geometry shader program.

11. The APD of claim 10, wherein:
the vertex shader program specifies vertex shader outputs that indicate to graphics processing hardware locations of vertex shader output values to transfer to a subsequent stage in the graphics processing pipeline; and
the combined shader program does not include the vertex shader outputs.

12. The APD of claim 10, wherein the scheduler is configured to reserve the resources by:
selecting a greater number of registers of a first number of registers for executing the vertex shader program and a second number of registers for executing either the hull shader program or the geometry shader program; and
reserving the greater number of registers.

13. The APD of claim 10, wherein the scheduler is further configured to:
receive an indication of a number of vertices to be processed by a vertex shader portion of the combined shader stage and either a number of patches to be processed by the hull shader stage or a number of primitives to be processed by the geometry shader stage; and
determine a number of wavefronts for processing the number of vertices by the vertex shader portion of the combined shader stage,
wherein spawning the number of wavefronts to execute the combined shader program comprises spawning the determined number of wavefronts to execute the combined shader program.

14. The APD of claim 13, wherein the scheduler is further configured to:
disable one or more of the wavefronts based on a ratio of a first number of work-items to execute the vertex shader program and a second number of work-items to execute either the hull shader program or the geometry shader program,
wherein disabling comprises one of causing the one or more of the wavefronts to sleep or terminating the one or more wavefronts.

15. The APD of claim 9, wherein:
the combined shader program includes a barrier instruction between a vertex shader portion and either a hull shader portion or a geometry shader portion, and
the barrier instruction causes processing in the vertex shader portion to wait to begin until processing in the hull shader portion or geometry shader portion is complete.

16. The APD of claim 9, wherein the scheduler is further configured to:

reserve resources for a number of wavefronts to execute the combined shader program in the plurality of shader engines, the number of wavefronts being the greater of a number of wavefronts to execute instructions from the vertex shader program and instructions from the hull shader program or geometry shader program.

17. A computer system for executing a shader program for a combined shader stage of a graphics processing pipeline, the computer system comprising:
    a processor executing a device driver for controlling an accelerated processing device (APD); and
    the APD, comprising:
        a plurality of shader engines including registers and local data store memory; and
        a scheduler configured to:
            receive a combined shader program for the combined shader stage from the device driver, wherein the combined shader stage includes one of a combined vertex shader and hull shader stage and a combined vertex shader and geometry shader stage, the combined shader program including instructions from a vertex shader program and either a hull shader program or a geometry shader program;
            for a first primitive for which tessellation is disabled and geometry shading is enabled, configure the graphics processing pipeline in a vertex shader/geometry shader configuration, in which a vertex shader stage and stages for tessellation, including the combined vertex and hull shader stage, are bypassed;
            for a second primitive, for which tessellation is enabled, configure the graphics pipeline in a vertex/hull shader configuration, in which the vertex shader stage is bypassed, and in which the combined vertex shader and geometry shader stage does not process the second primitive; and
            reserve resources for a number of wavefronts to execute the combined shader program in the plurality of shader engines, the number of wavefronts being the greater of a number of wavefronts to execute instructions from the vertex shader program and instructions from the hull shader program or geometry shader program; and
        spawn the number of wavefronts to execute the combined shader program in the plurality of shader engines.

18. The computer system of claim 17, wherein the scheduler is further configured to:
    reserve resources for a number of wavefronts to execute the combined shader program in the plurality of shader engines, the number of wavefronts being the greater of a number of wavefronts to execute instructions from the vertex shader program and instructions from the hull shader program or geometry shader program.

* * * * *